Dec. 20, 1966    E. R. FRYER    3,292,724
STEERING AND COUPLING MECHANISM FOR ARTICULATED VEHICLES
Filed Oct. 19, 1964    2 Sheets-Sheet 1

INVENTOR.
Edward R. Fryer
BY
W. F. Wagner
ATTORNEY

INVENTOR.
Edward R. Fryer
BY
W. F. Wagner
ATTORNEY

United States Patent Office 3,292,724
Patented Dec. 20, 1966

3,292,724
STEERING AND COUPLING MECHANISM FOR ARTICULATED VEHICLES
Edward R. Fryer, Euclid, Ohio, assignor to General Motors Corporation, Detroit, Mich., a corporation of Delaware
Filed Oct. 19, 1964, Ser. No. 404,668
3 Claims. (Cl. 180—79.2)

This invention concerns a steering and coupling mechanism for vehicles comprising interconnecting frame sections and more particularly for self-propelled scraper vehicles of the type comprising a tractor-drawn scraper bowl in which the tractor and scraper are interconnected about a vertical steering axis.

Vehicles of the type to which the present invention pertains typically have two frame sections each of which is provided with suitably non-dirigibly mounted ground-engaging wheels and the frame sections being articulately interconnected by suitable means to define a vertical axis of relative steering articulation therebetween. While vehicles of this type may be employed in various environments, such as prime movers adapted to be equipped with several attachments and such as loader linkage or dozer blades, the present invention particularly comprehends a self-propelled scraper construction in which the two frame sections consist of a two-wheeled overhung tractor articulately connected to a drawn two-wheeled scraper bowl.

In scraper constructions of the above described type, it is desirable to have a steering mechanism of rugged and simple construction that connects the two frame sections of the vehicle and provides a substantially constant mechanical advantage throughout the entire range of steering movement of the vehicle.

Accordingly, a principal object and feature of this invention is to provide a steering and coupling mechanism for articulated vehicles that includes operating linkage of simple and rugged construction and which is relatively inexpensive to manufacture and assemble.

Stated broadly, the present invention contemplates a steering and coupling mechanism for an articulated vehicle having relatively movable first and second frame sections. The frame sections are interconnected about a vertical steel axis and have incorporated therewith power operated means that act through a pair of drive links and a pair of idler links for moving one frame section relative to the other. The drive and idler links are substantially identical in configuration and are so arranged that when the frame sections are aligned for straight-ahead movement, the pivot connections between the links and the frame sections are located along the longitudinal center axis of the vehicle and in a line that is normal to the axis and passes through the steer axis.

A more complete understanding of the invention can be derived from the following detailed description taken in conjunction with the drawings in which.

Figure 1:
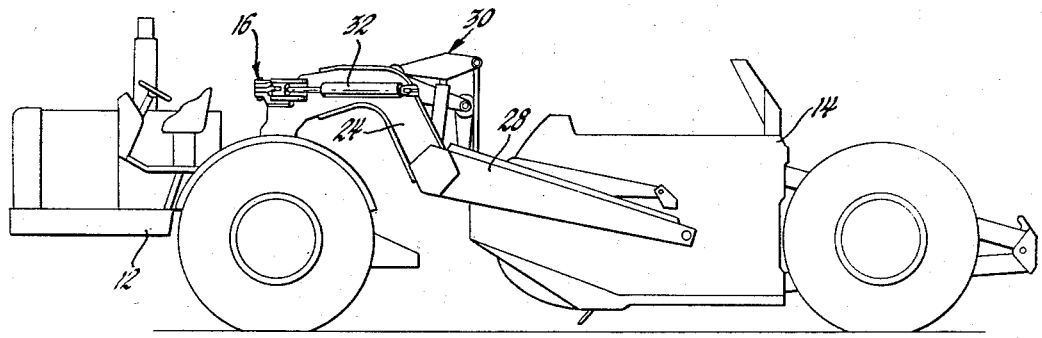
FIGURE 1 is an elevational view showing a scraper employing a steering and coupling arrangement made in accordance with the invention.
Figure 2:
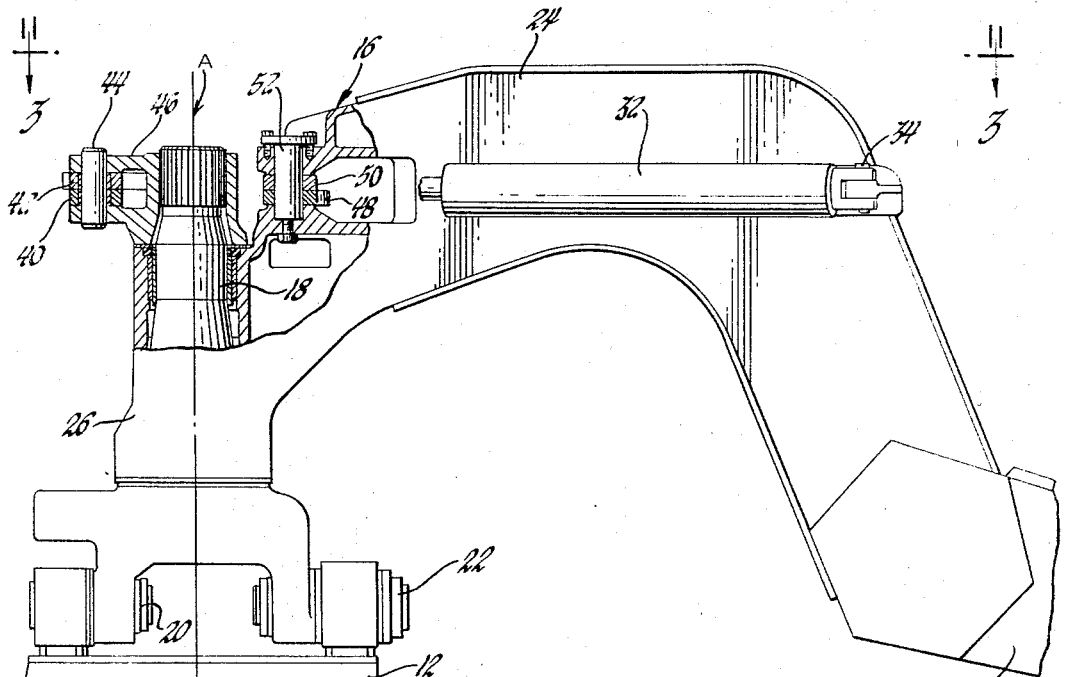
FIGURE 2 is an enlarged view with portions broken away showing in detail the steering and coupling arrangement employed with the vehicle of FIGURE 1.
Figure 4:
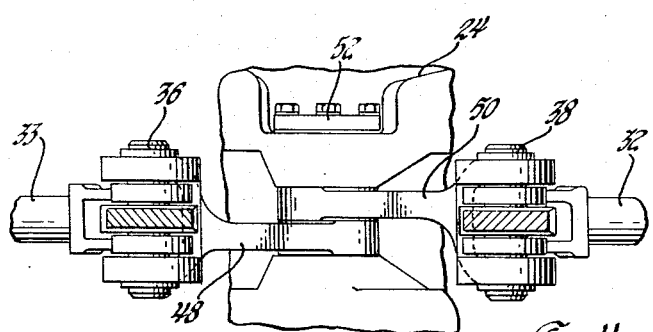
FIGURE 4 is an enlarged sectional view taken on lines 4—4 of FIGURE 3.

Referring now to FIGURE 1 of the drawings, a scraper is shown comprising a two-wheeled overhung tractor 12 which is connected to a trailing scraper bowl 14 by a steering and coupling mechanism 16 shown in detail in FIGURE 2. The steering and coupling mechansim includes a vertically upstanding king pin 18 which is pivotally connected to the tractor 12 for oscillatory movement about a horizontal axis by the pivot connections 20 and 22. A gooseneck or draw bar 24 has a pivot housing 26 formed therewith that is journaled on the king pin for rotation about the longitudinal center of the latter as indicated by the vertical axis A between the tractor and the scraper bowl.

As is usual with scrapers of the subject type, the draw bar 24 is rigidly connected with a pair of transversely spaced pull arms, one of which is shown and indicated by the numeral 28, that extend rearwardly for pivotal connection with the bowl 14. In addition, the scraper includes the usual operating mechanism generally indicated by the numeral 30 for purposes of raising and lowering the scraper bowl and the usual apron associated therewith.

Figure 3:
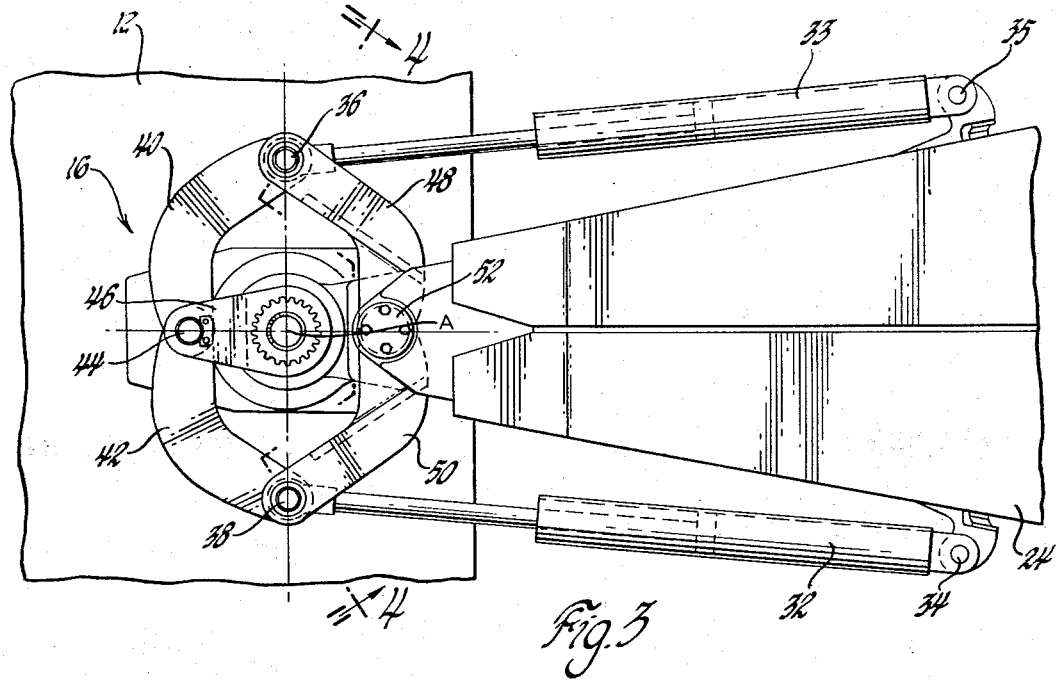
FIGURE 3 is a view taken on line 3—3 of FIGURE 2.

As best seen in FIGURE 3, the steering portion of the mechanism 16 includes a pair of double-acting hydraulic jacks 32 and 33, each of which incorporates the usual relatively reciprocable piston rod and cylinder member. In this instance, the cylinder members of the respective jacks are pivotally connected at 34 and 35 to brackets rigidly secured to opposite sides of the draw bar 24 while the piston rods are pivotally connected at 36 and 38 to V-shaped drive link members 40 and 42. The drive link members in turn are pivotally connected about a common pivot connection 44 to a lever or crank arm 46 which is rigidly connected to the top of the king pin 18 by a spline connection. A pair of V-shaped idler links 48 and 50 are connected to the drive links at 36 and 38 and extend rearwardly for pivotal connection to the draw bar about a common pivot connection indicated by the numeral 52.

Figure 5:
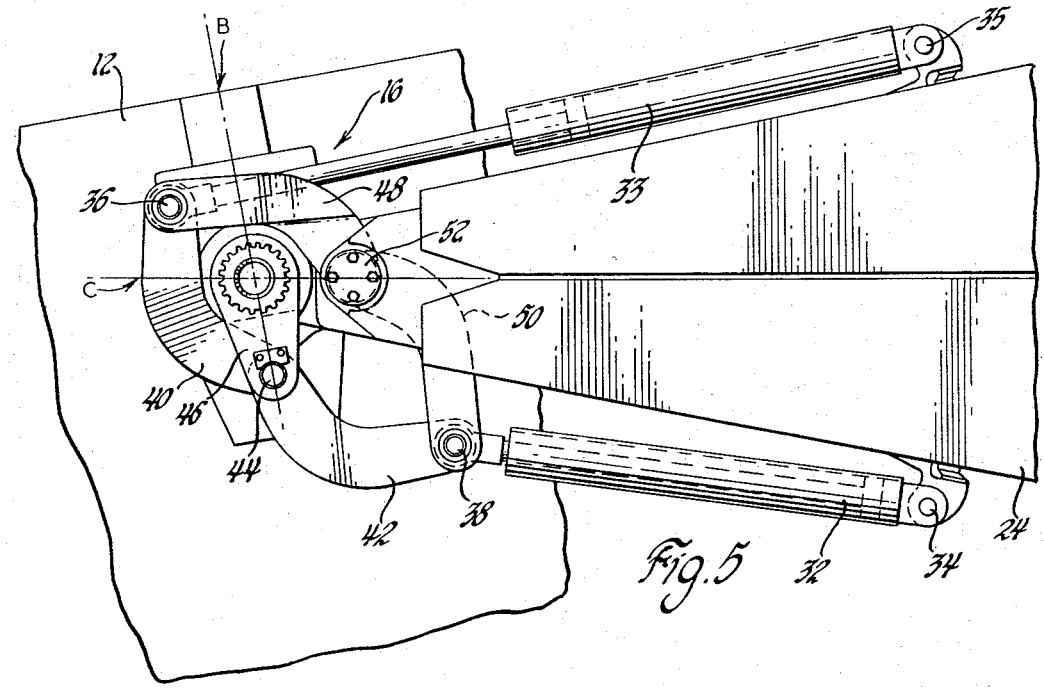
FIGURE 5 is a view similar to FIGURE 3 showing the relative positions of the various components of the steering linkage when the tractor is in a full turn relative to the scraper bowl.

As is conventional in operating mechanisms of the above-described type, the jacks 32 and 33 are connected with a fluid operating system which selectively provides pressurized fluid to the opposite ends of the jacks. Thus, when pressurized fluid is directed to the cylinder end of the jack 33 and the rod end of jack 32, the tractor is rotated through the linkage counterclockwise about the steer axis A so that the drive and idler links assume the relative positions shown in FIGURE 5. As should be apparent by directing pressurized fluid to the opposite ends of the respective jacks will cause the tractor to be rotated clockwise about the steer axis relative to the bowl.

It will be noted that as seen in FIGURE 3 and when the tractor 12 and the scraper bowl 14 are in line so that the vehicle is moving straight ahead, the pivot connections 44, 52, and the steer axis A are located along the longitudinal center axis of the vehicle. Moreover, during such time the pivot connections 36, 38, and the steer axis are located in a plane which is normal to the vehicle's longitudinal center axis. Thus, with this particular arrangement of links and pivot connections and by forming the drive and idler links in the arcuate or V form, it is possible to realize a steering range of more than 180° from full left turn to full right turn of the tractor relative to the scraper bowl. This can be seen in FIGURE 5 where the axes B and C, respectively, constitute the longitudinal center axes of the tractor 12 and the scraper bowl 14, and the tractor is in a full turn.

Various changes and modifications can be made in this construction without departing from the spirit of the invention. Such changes and modifications are contemplated by the inventor and he does not wish to be limited except by the scope of the appended claims.

What is claimed is:
1. A steering mechanism for an articulated vehicle comprising first and second frame sections, means pivot- ally interconnecting said frame sections about a vertical steering axis for relative steering articulation therebetween to either side of straight-ahead steering alignment of said frame sections, a lever rigidly connected to said first frame section, a V-shaped drive link having one end connected to said lever for pivotal movement about a first pivot axis that is laterally spaced from said vertical steering axis, a V-shaped idler link having one end connected to the second frame section for pivotal movement about a second pixot axis that is laterally spaced from the steering axis a distance equal to the spacing between the steering axis and said first pivot axis, the free ends of said drive link and said idler link being interconnected for pivotal movement about a third pivot axis, a fluid pressure-operated steering jack including relatively reciprocable piston and cylinder members, means mounting one of said members on said second frame section, means connecting the other of said members to said drive and idler links for pivotal movement about said third pivot axis, said pivot axes being so located that when said frame sections are aligned for straight-ahead movement of the vehicle a first straight line connecting said first and second pivot axes passes through the vertical steering axis and a second straight line connecting the third pivot axis with said steering axis is located in a position normal to said first straight line, the arrangement being such that a steering range of more than 180° from full left turn to full right turn of the first frame section relative to the second frame section is attainable.

2. A steering mechanism for an articulated scraper vehicle comprising a tractor and a trailing bowl portion, a king pin upstanding from said tractor and connected thereto for oscillation about a horizontal axis, a drawbar connected to the bowl portion, a pivot housing formed with said drawbar and journaled on said king pin, a lever rigidly connected to said king pin above said housing, a V-shaped drive link having one end connected to said lever for pivotal movement about a first pivot axis that is laterally spaced from the center of the king pin, a V-shaped idler link having one end connected to said drawbar for pivotal movement about a second pivot axis that is laterally spaced from the center of the king pin a distance equal to the spacing between the king pin center and said first pivot axis, the free ends of said drive link and said idler link being interconnected for pivotal movement about a third pivot axis, a fluid pressure-operated steering jack including relatively reciprocable piston and cylinder members, means mounting one of said members on said drawbar, means connecting the other of said members to said drive and idler links for pivotal movement about said third pivot axis, said pivot axes being so located that when said frame sections are aligned for straight-ahead movement of the vehicle a first straight line connecting said first and second pivot axes passes through the center of the king pin and a second straight line connecting the third pivot axis with the king pin center is located in a position normal to said first straight line, the arrangement being such that a steering range of more than 180° from full left turn to full right turn of the tractor relative to the trailing bowl is attainable.

3. A steering mechanism for an articulated vehicle comprising first and second frame sections, a king pin upstanding from one of said frame sections, a housing journaled on said king pin and having a portion connected to the other of said frame sections, a lever rigidly connected to said king pin, a V-shaped drive link having one end connected to said lever for pivotal movement about a first pivot axis that is laterally spaced from the center of the king pin, a V-shaped idler link having one end connected to said housing for pivotal movement about a second pivot axis that is laterally spaced from the center of the king pin a distance equal to the spacing between the king pin center and said first pivot axis, the free ends of said drive link and said idler link being interconnected for pivotal movement about a third pivot axis, a fluid pressure-operated steering jack including relatively reciprocable piston and cylinder members, means mounting one of said member on said portion of said housing, means connecting the other of said members to said drive and idler links for pivotal movement about said third pivot axis, said pivot axes being so located that when said frame sections are aligned for straight-ahead movement of the vehicle a first straight line connecting said first and second pivot axes passes through the center of the king pin and a second straight line connecting the third pivot axis with the king pin center is located in a position normal to said first straight line, the arrangement being such that a steering range of more than 180° from full left turn to full right turn of the first frame section relative to the second frame section is attainable.

References Cited by the Examiner
UNITED STATES PATENTS

| | | | |
|---|---|---|---|
| 2,638,998 | 5/1953 | Rockwell | 180—79.2 |
| 3,097,719 | 7/1963 | Rood | 180—79.2 |

BENJAMIN HERSH, *Primary Examiner.*

J. H. BRANNEN, *Assistant Examiner.*